United States Patent
Snyder et al.

(10) Patent No.: US 9,839,176 B1
(45) Date of Patent: Dec. 12, 2017

(54) ACCESSORY MOUNT FOR TURF OR GROUNDS CARE EQUIPMENT

(71) Applicant: Brinly-Hardy Company, Jeffersonville, IN (US)

(72) Inventors: Chris Snyder, Louisville, KY (US); Ronnie Chasteen, Louisville, KY (US)

(73) Assignee: Brinly-Hardy Company, Jeffersonville, IN (US)

( * ) Notice: Subject to any disclaimer, the term of this patent is extended or adjusted under 35 U.S.C. 154(b) by 24 days.

(21) Appl. No.: 14/748,660

(22) Filed: Jun. 24, 2015

Related U.S. Application Data

(60) Provisional application No. 62/016,887, filed on Jun. 25, 2014.

(51) Int. Cl.
  *A01B 76/00* (2006.01)
  *A01B 45/00* (2006.01)
  *A01B 45/02* (2006.01)
  *A01D 42/00* (2006.01)

(52) U.S. Cl.
  CPC .............. *A01B 76/00* (2013.01); *A01B 45/00* (2013.01); *A01B 45/02* (2013.01); *A01D 42/00* (2013.01)

(58) Field of Classification Search
  CPC ......... A01B 76/00; A01B 45/00; A01B 45/02; A01D 42/00; A01D 34/00; B25B 5/10
  USPC ....................................................... 269/143
  See application file for complete search history.

(56) References Cited

U.S. PATENT DOCUMENTS

| | | | | |
|---|---|---|---|---|
| 4,638,622 A | * | 1/1987 | Smith ................... | A01D 34/82 56/17.4 |
| 4,899,828 A | * | 2/1990 | Harris ................... | A01B 45/02 172/21 |
| 5,358,056 A | * | 10/1994 | Gates ................... | A01B 73/048 172/311 |
| 6,089,556 A | * | 7/2000 | Whiteford ............. | B25B 1/12 269/143 |
| 6,241,025 B1 | * | 6/2001 | Myers ................... | A01B 35/28 172/21 |
| 6,832,657 B1 | * | 12/2004 | LaFlair ................. | A01B 59/064 172/21 |
| 6,962,039 B2 | * | 11/2005 | Greenhoe ............. | A01B 29/041 56/16.7 |
| 6,971,641 B1 | * | 12/2005 | Sherwin ............... | B25B 5/068 269/166 |

(Continued)

*Primary Examiner* — Alicia Torres
*Assistant Examiner* — Adam J Behrens
(74) *Attorney, Agent, or Firm* — Stites & Harbison, PLLC; David W. Nagle, Jr.

(57) ABSTRACT

An accessory mount comprises: a lateral bar having a first end and a second end opposite the first end; a first arm connected to the first end of the lateral bar and terminating in a distal end; and a second arm pivotally connected to the second end of the lateral bar and terminating in a distal end. The first and second arms of the accessory mount are configured to engage respective frame portions of a mower or other turf or grounds care equipment, and the pivoting or movement of the second arm relative to the lateral bar adjusts a distance between the distal end of the first arm and the distal end of the second arm. A first clamping assembly may be connected to the first arm, and a second clamping assembly may be connected to the second arm to engage the respective frame portions of the article of turf or grounds care equipment.

14 Claims, 5 Drawing Sheets

(56) References Cited

U.S. PATENT DOCUMENTS

| | | | | |
|---|---|---|---|---|
| 7,024,845 B2* | 4/2006 | Kallevig | ............... | A01D 43/00 56/17.4 |
| 7,108,461 B1* | 9/2006 | Colburn | ................... | B25B 5/10 269/276 |
| 7,631,477 B2* | 12/2009 | Eavenson, Sr. | ........ | A01D 43/00 56/1 |
| 8,424,613 B2* | 4/2013 | Hurley | .................. | A01B 45/02 172/21 |
| 2004/0182056 A1* | 9/2004 | Greenhoe | ........... | A01B 29/041 56/1 |
| 2006/0107519 A1* | 5/2006 | Wang | ..................... | B23K 3/087 29/596 |
| 2008/0203637 A1* | 8/2008 | Li | .......................... | B25B 1/103 269/71 |
| 2010/0032535 A1* | 2/2010 | Elliott | .................... | B25H 3/006 248/229.22 |
| 2010/0164202 A1* | 7/2010 | Dilworth | ............. | A01B 59/064 280/477 |
| 2010/0198444 A1* | 8/2010 | Jensen | ................ | A01B 69/006 701/26 |
| 2011/0203816 A1* | 8/2011 | Hurley | .................. | A01D 43/12 172/21 |
| 2013/0019581 A1* | 1/2013 | Hyronimus | ........... | A01D 63/00 56/314 |
| 2013/0193627 A1* | 8/2013 | Antoine | ................... | B25B 5/14 269/145 |
| 2013/0221593 A1* | 8/2013 | Melchior | ................. | B25B 5/10 269/107 |

\* cited by examiner

ACCESSORY MOUNT FOR TURF OR GROUNDS CARE EQUIPMENT

CROSS-REFERENCE TO RELATED APPLICATIONS

The present application claims priority to U.S. Patent Application Ser. No. 62/016,887 filed on Jun. 25, 2014.

BACKGROUND OF THE INVENTION

The present invention is an accessory mount for turf or grounds care equipment, such as a zero-turn radius mower.

Zero-turn radius mowers are commonly used by turf and grounds care professionals for mowing grass, but, in many cases, it is desirable to attach a turf and grounds care accessory to the mower to complete other jobs. Similarly, it is often desirable to attach an accessory to other types of mowers or turf or grounds care equipment. One such accessory is a dethatcher which runs a series of metal blades, tines, or prongs along the ground to remove dead grass, leaves, stems, and the like. Other accessories include, but are not limited to, an aerator, lawn roller, fertilizer spreader, storage cart, or the like. Zero-turn radius mowers and other turf or grounds care equipment made by different manufacturers may contemplate and provide certain frameworks for securing such accessories. However, because each manufacturer constructs the mower differently, accessories often cannot be readily interchanged between mowers or other turf or grounds care equipment from different manufacturers.

SUMMARY OF THE INVENTION

The present invention is an accessory mount for turf or grounds care equipment, such as a zero-turn radius mower. In particular, the present invention is an accessory mount for turf or grounds care equipment, such as a zero-turn radius mower, that is adjustable, such that it can be installed on mowers or other turf or grounds care equipment that are not provided with any framework for securing such accessories, or it can be installed on mowers or other turf or grounds care equipment from different manufacturers. In short, it can be characterized as a "universal" accessory mount.

An exemplary accessory mount made in accordance with the present invention is comprised of an adjustable lateral bar having a first end and a second end opposite the first end. A first arm is connected to the first end of the lateral bar, the first arm terminating in a distal end, and a second arm is pivotally connected to a second end of the lateral bar, the second arm also terminating in a distal end. Furthermore, a clamping assembly is adjustably connected to each of the first and second arms.

In some exemplary embodiments, the lateral bar is comprised of: a first member, which includes the first end of the lateral bar; and a second member, which includes the second end of the lateral bar and is configured to fit over and slide relative to the first member, such that the distance between the first end and the second end, and thus the distance between the distal end of the first arm and the distal end of the second arm, is adjustable by sliding the second member relative to the first member. The lateral bar further comprises an adjustment mechanism, in the form of a pin-and-hole connection, such that the position of the first member can be adjusted and fixed relative to the second member.

In some exemplary embodiments, the first arm includes two parallel plates fixed (e.g., welded) to the top and bottom surfaces of the first member of the lateral bar and extending substantially perpendicular to the longitudinal axis of the lateral bar. Similarly, the second arm includes two parallel plates positioned adjacent the top and bottom surfaces of the lateral bar. However, unlike the first arm, the two plates of the second arm are connected to the second member of the lateral bar, such that the second arm can pivot (or rotate) relative to the lateral bar.

The two parallel plates of the second arm each include an angled portion which extends from the second arm opposite from the distal end of the second arm, such that an angle is defined between the angled portions of the second arm and the lateral bar. Interposed between the two plates of the angled portions is a connecting plate. An adjustment rod is inserted through a hole defined by the connecting plate, such that a portion of the adjustment rod extends between the angled portions of the second arm, with a distal end of the adjustment rod contacting the lateral bar. Rotating the adjustment rod causes it to move toward and contact the lateral bar. Once the adjustment rod contacts the lateral bar, further rotation of the adjustment rod causes the connecting plate to move away from the lateral bar, thus causing the second arm to pivot.

As discussed above, a first clamping assembly is adjustably connected to the first arm, and a second clamping assembly is adjustably connected to the second arm. In some exemplary embodiments, each clamping assembly includes a U-shaped member and a clamping plate, which are held together by one or more fasteners (e.g., bolts). The U-shaped member can be characterized as having a base panel connecting an upper panel and a lower panel, with each of the upper panel and the lower panel terminating in a free end defining a V-shaped seat. Advantageously, the V-shaped seats of the clamping assemblies will accommodate various diameters of frame portions on mowers or other turf or grounds care equipment.

Each clamping assembly is configured to surround the respective first or second arm of the accessory mount, such that the upper panel of the U-shaped member is adjacent to the upper plate of the arm, and the lower panel of the U-shaped member is adjacent to the lower plate of the arm. The base panel of the U-shaped member and the clamping plate then contact and engage the edges of the two parallel plates of the arm. In this way, the clamping assembly is capable of sliding along the length of the arm, but its position can also be fixed as desired.

In installing the accessory mount on a mower (or other turf or grounds care equipment), the length of the lateral bar is adjusted to provide a gross adjustment, such that the accessory mount is secured (at least loosely) to and extends between the selected frame portions of the mower. The angle of the second arm relative to the lateral bar is then adjusted to ensure a firm connection between the accessory mount and the mower. Specifically, the adjustment rod is rotated to increase the angle between the angled portions of the second arm and the lateral bar, which, in turn, rotates the second arm, shortening the distance between the distal ends of the first and second arms, and thus ensuring a firm connection between the clamping assemblies and the frame portions of the mower.

Finally, the clamping assemblies are capable of adjusting the distance of the lateral bar from the mower (or other turf or grounds care equipment). Specifically, the fasteners connecting the U-shaped members and the clamping plates of each clamping assembly can be loosened to allow the clamping assemblies to slide along the length of the first and second arms. Thus, the lateral bar can be adjusted closer to the mower by sliding the clamping assemblies toward the lateral bar, and the lateral bar can be adjusted away from the mower by sliding the clamping assemblies away from the lateral bar.

Once the lateral bar is the desired distance from the mower (or other turf or grounds care equipment), the fasteners of the clamping assemblies are tightened, reducing the distance between the base panels of the U-shaped member, such that the first and second clamping assemblies are pressed into secure frictional engagement with the first and second arms.

Advantageously, the frictional engagement between the clamping assemblies and the first and second arms provides a safe "failure point" if the mower (or other turf or grounds care equipment) strikes an object. Specifically, if an accessory strikes an object, the clamping assemblies can slide along the first and second arms to absorb the impact. In this way, some other portion of the accessory mount, the accessory, or the mower is protected from potential damage. The clamping assemblies can then be returned to the original position to continue operation of the mower.

DETAILED DESCRIPTION OF THE INVENTION

The present invention is an accessory mount for turf or grounds care equipment, such as a zero-turn radius mower. In particular, the present invention is an accessory mount for turf or grounds care equipment, such as a zero-turn radius mower, that is adjustable, such that it can be installed on mowers or other turf or grounds care equipment that are not provided with any framework for securing such accessories, or it can be installed on mowers or other turf or grounds care equipment from different manufacturers.

Figure 1:
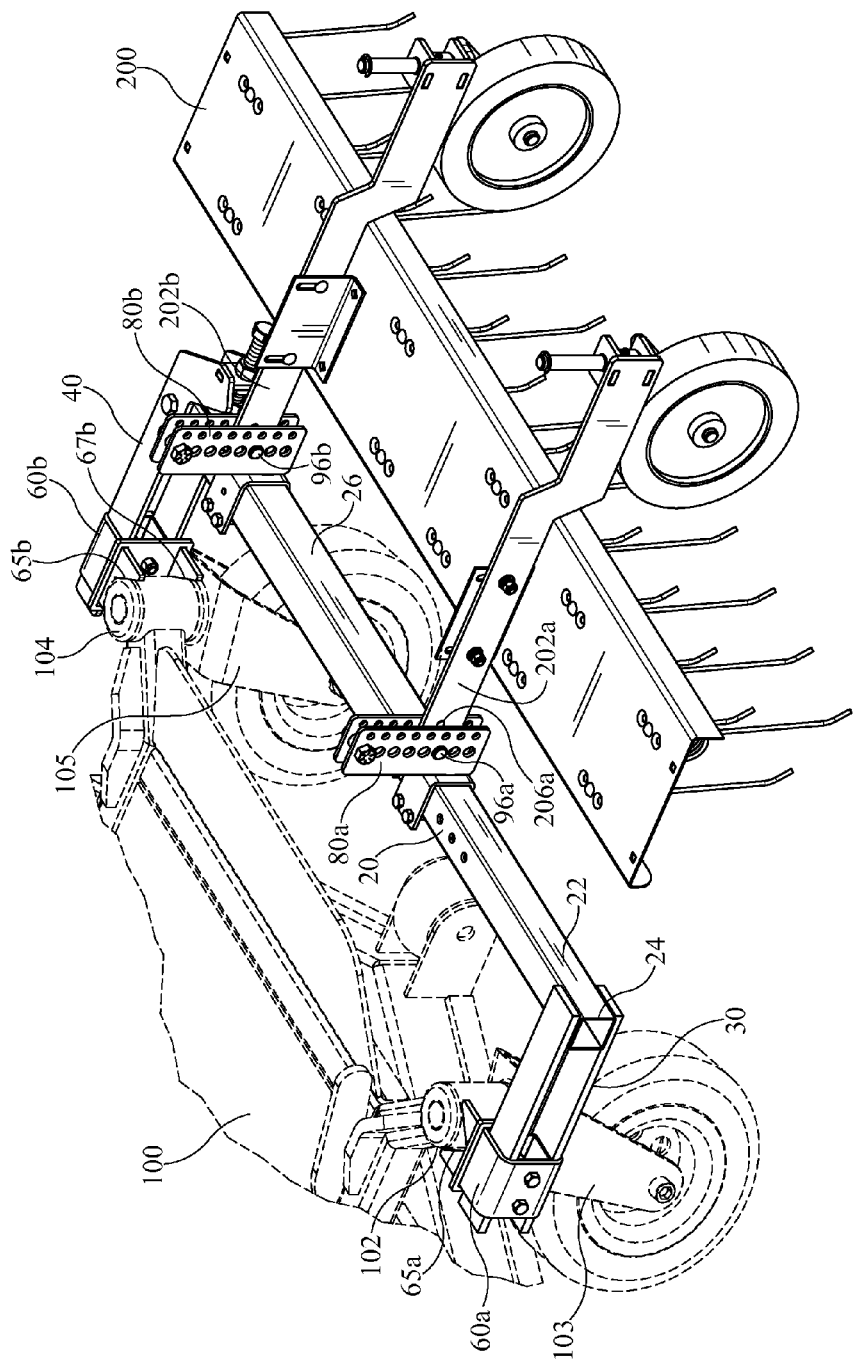
FIG. 1 is a perspective view of an exemplary accessory mount made in accordance with the present invention and used to mount a dethatcher on a zero-turn radius mower.

Referring to FIG. 1, a typical zero-turn radius mower 100 includes two front casters 103, 105. The wheel of each caster 103, 105 is supported by a bracket. The bracket includes a vertical shaft that is received in and supported by a frame portion 102, 104 that is part of or is secured to the mower 100, thus mounting each caster 103, 105 to the mower 100. In particular, as shown in FIG. 1, a first frame portion 102 mounts a first caster 103, and a second frame portion 104 mounts a second caster 105. The accessory mount 10 of the present invention is secured to and extends between the frame portions 102, 104 and is used to removably attach an accessory 200, such as a dethatcher, to the mower 100, as further discussed below.

Figure 2:
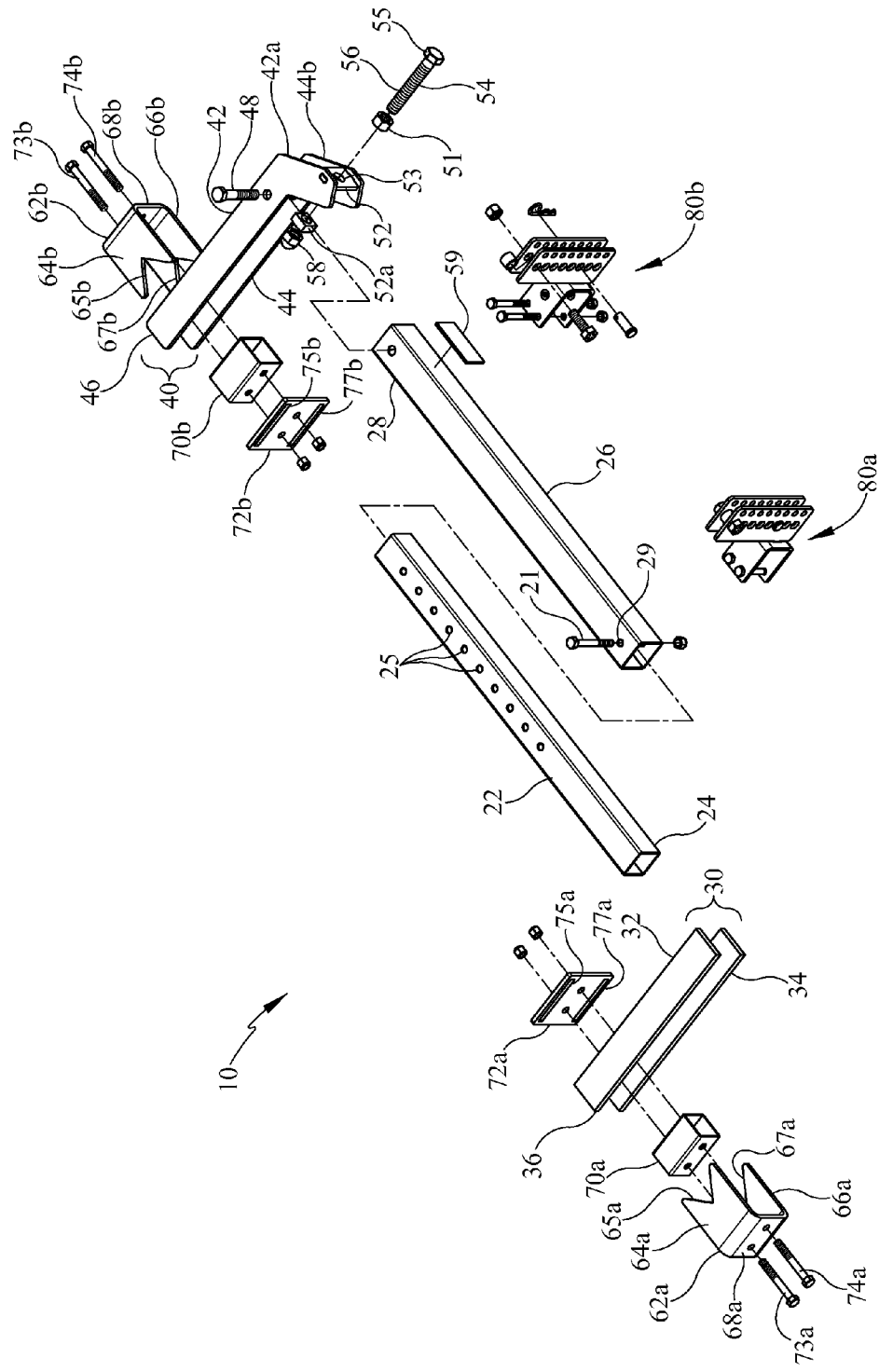
FIG. 2 is an exploded perspective view of the exemplary accessory mount of FIG. 1.
Figure 3:
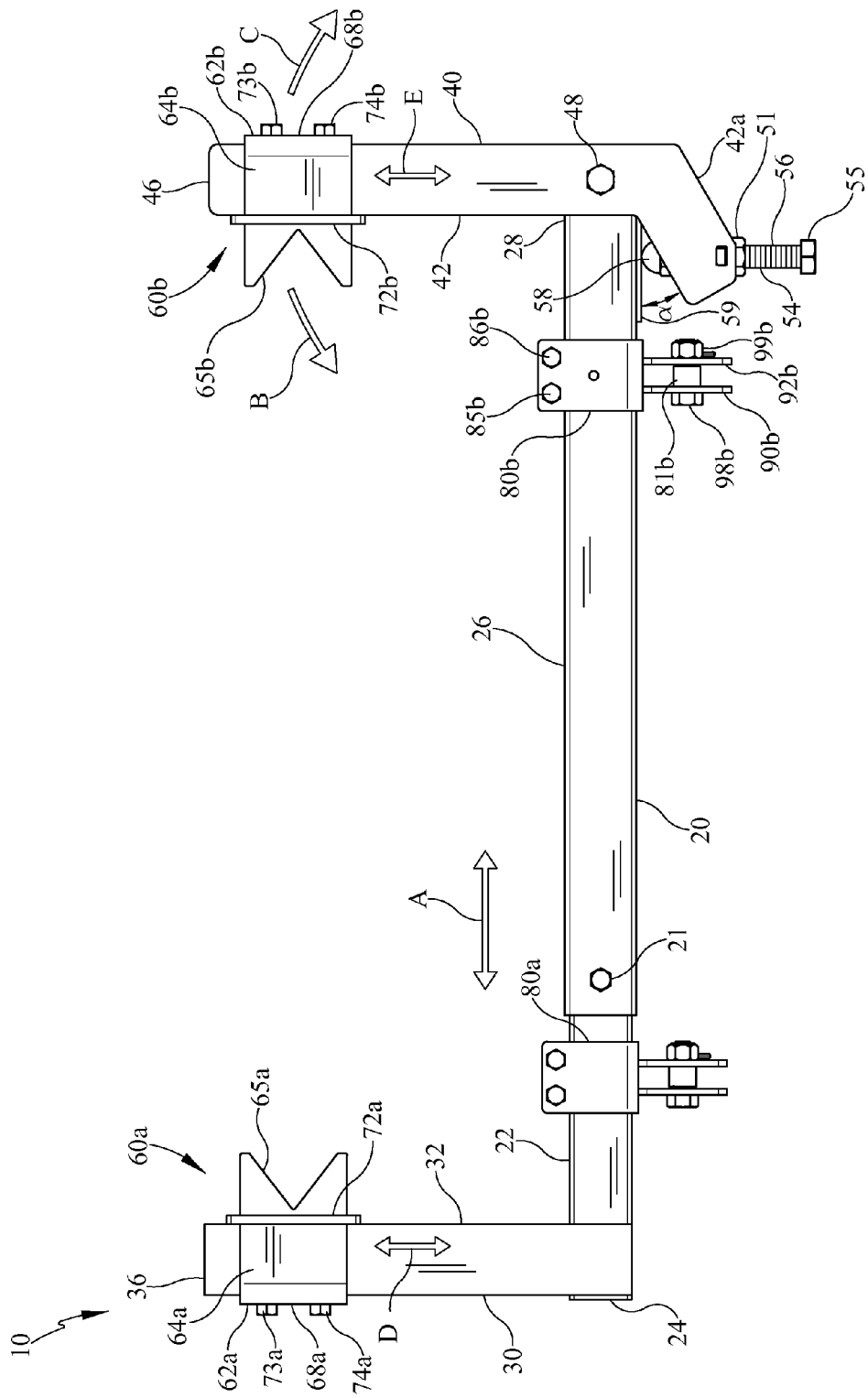
FIG. 3 is a top, assembled view of the exemplary accessory mount of FIG. 1, which illustrates the adjustability of the accessory mount.

Referring now to FIGS. 2 and 3, an exemplary accessory mount 10 made in accordance with the present invention is comprised of an adjustable lateral bar 20 having a first end 24 and a second end 28 opposite the first end 24. A first arm 30 is connected to the first end 24 of the lateral bar 20, the first arm 30 terminating in a distal end 36, and a second arm 40 is pivotally connected to a second end 28 of the lateral bar 20, the second arm 40 also terminating in a distal end 46. Furthermore, a clamping assembly 60a, 60b is adjustably connected to each of the first and second arms 30, 40, as further discussed below.

Referring still to FIGS. 2 and 3, in this exemplary embodiment, the lateral bar 20 is comprised of: a first member 22 which includes the first end 24 of the lateral bar 20; and a second member 26, which includes the second end 28 of the lateral bar 20 and is adjustably connected to the first member 22. In particular, the second member 26 is configured to fit over and slide relative to the first member 22, such that the distance between the first end 24 and the second end 28, and thus the distance between the distal end 36 of the first arm 30 and the distal end 46 of the second arm 40, is adjustable by sliding the second member 26 relative to the first member 22. Such sliding movement is illustrated by arrow A in FIG. 3 and is further discussed below. In this exemplary embodiment, the first and second members 22, 26 of the lateral bar 20 have square cross-sections; however, it is contemplated that other cross-sectional shapes, such as round or rectangular shapes, may be used without departing from the spirit and scope of the present invention.

Referring still to FIGS. 2 and 3, in this exemplary embodiment, the lateral bar 20 further comprises an adjustment mechanism, such that the position of the first member 22 can be adjusted and fixed relative to the second member 26. Referring now to FIG. 2, in this exemplary embodiment, the adjustment mechanism is in the form of a pin-and-hole connection. Specifically, the first member 22 of the lateral bar 20 defines a series of holes 25 aligned along the longitudinal axis of the first member 22 at predetermined intervals, in this case, through the top surface of the first member 22. The second member 26 of the lateral bar 20 defines at least one hole 29 (e.g., a single hole), such that when the single hole 29 of the second member 26 is placed in registry with one of the series of holes 25 of the first member 22, a fastener 21 can be inserted through the single hole 29 of the second member 26 and the aligned one of the series of holes 25 of the first member 22, thus fixing the position of the first member 22 relative to the second member 26. Although the fastener 21 is illustrated as a common bolt in FIGS. 2 and 3, any other fastener or known means of adjusting the position of the first member 22 relative to the second member 26, and then fixing the position of the first member 22 relative to the second member 26, may also be used without departing from the spirit and scope of the present invention.

Referring still to FIGS. 2 and 3, the first arm 30 is connected to a first end 24 of the first member 22 of the lateral bar 20. In this exemplary embodiment, the first arm 30 is comprised of two parallel plates 32, 34 fixed (e.g., welded) to the top and bottom surfaces of the first member 22 of the lateral bar 20 and extending substantially perpendicular to the longitudinal axis of the lateral bar 20.

Referring still to FIGS. 2 and 3, the second arm 40 is pivotally connected to a second end 28 of the second member 26 of the lateral bar 20. Similar to the first arm 30, the second arm 40 is comprised of two parallel plates 42, 44 positioned adjacent the top and bottom surfaces of the second member 26 of the lateral bar 20. However, unlike the first arm 30, the two plates of the second arm 40 are connected to the second member 26 of the lateral bar 20, such that the second arm 40 can pivot (or rotate) relative to the lateral bar 20, as illustrated by arrows B and C in FIG.

3. To this end, a bolt 48 (or similar pin or fastener) extends through both parallel plates 42, 44 of the second arm 40 and the lateral bar 20, securing the second arm 40 to the lateral bar 20 and defining a pivot axis.

Referring still to FIGS. 2 and 3, the two parallel plates 42, 44 of the second arm 40 each include an angled portion 42a, 44a which extends from the second arm 40 opposite from the distal end 46 of the second arm 40 such that an angle, a (shown in FIG. 3), is defined between the angled portions 42a, 44a of the second arm 40 and the lateral bar 20. Interposed between the two plates of the angled portions 42a, 44a is a means of adjusting the angle, a. Specifically, in this exemplary embodiment, a connecting plate 52 is secured to and extends between the angled portions 42a, 44a of the two parallel plates 42, 44 of the second arm 40. The connecting plate 52 defines a hole 53, and in this exemplary embodiment, a threaded nut 52a is secured (e.g., welded) to the connecting plate 52 in registry with the hole 53. An adjustment rod 54 is inserted through the hole 53 defined by the connecting plate 52 and threaded through the threaded nut 52a, such that a portion of the adjustment rod 54 extends between the angled portions 42a, 44a of the second arm 40, with a distal end of the adjustment rod 54 contacting the lateral bar 20.

As perhaps best shown in FIG. 2, in this exemplary embodiment, the adjustment rod 54 is a bolt with a head 55 and a threaded shaft 56. Furthermore, in this exemplary embodiment, the adjustment rod is threaded through a locking nut 51 before being inserted into the hole 53 defined by the connecting plate 52. Finally, in this exemplary embodiment, an end cap 58 is then attached to the distal end of the adjustment rod 54, after the adjustment rod 54 is threaded through the hole 53 of the connecting plate 52.

As will be further discussed below, rotating the adjustment rod 54 causes the end cap 58 to move toward and contact the lateral bar 20. Once the end cap 58 of the adjustment rod 54 contacts the lateral bar 20 (as shown in FIG. 3), further rotation of the adjustment rod 54 causes the connecting plate 52 to move away from the lateral bar 20, thus causing the second arm 40 to pivot about the longitudinal axis defined by the bolt 48. The angle, α, is increased as the second arm 40 rotates (counterclockwise in FIG. 3, in the direction of arrow B), while the distance between the distal end 36 of the first arm 30 and the distal end 46 of the second arm 40 is decreased.

As a further refinement, in this exemplary embodiment, and as shown in FIGS. 2 and 3, a reinforcing plate 59 is attached (e.g., welded) to the lateral bar 20 to provide increased structural support where the end cap 58 contacts the lateral bar 20.

Referring still to FIGS. 2 and 3, a first clamping assembly 60a is adjustably connected to the first arm 30, and a second clamping assembly 60b is adjustably connected to the second arm 40. In this exemplary embodiment, the first clamping assembly 60a includes a U-shaped member 62a and a clamping plate 72a, which are held together by one or more fasteners, in this case, two bolts 73a, 74a and associated nuts. The U-shaped member 62a can be characterized as having a base panel 68a connecting an upper panel 64a and a lower panel 66a, with each of the upper panel 64a and the lower panel 66a terminating in a free end defining a V-shaped seat 65a, 67a, as further discussed below.

Referring still to FIGS. 2 and 3, the second clamping assembly 60b similarly includes a U-shaped member 62b and a clamping plate 72b, which are also held together by one or more fasteners, in this case, two bolts 73b, 74b and associated nuts. The U-shaped member 62b can again be characterized as having a base panel 68b connecting an upper panel 64b and a lower panel 66b, with each of the upper panel 64b and the lower panel 66b also terminating in a free end defining a V-shaped seat 65b, 67b.

Referring once again to FIG. 1, since each frame portion 102, 104 for mounting the two front casters 103, 105 on a mower 100 is typically in the form of a cylinder (because it receives the vertical shaft of a caster bracket, which also has a cylindrical shape), the V-shaped seats 65a, 67a of the first clamping assembly 60a will accommodate frame portions 102, 104 of various diameters. Furthermore, each V-shaped seat 65a, 67a of the first clamping assembly 60a will maintain two points of contact regardless of the diameter of the first frame portion 102, and each V-shaped seat 65b, 67b of the second clamping assembly 60b will maintain two points of contact regardless of the diameter of the second frame portion 104.

As a further refinement, certain precautions can be taken to protect the frame portions 102, 104 from wear by the first and second clamping assemblies 60a, 60b. For example, a padded spacer (not shown) can be installed between the V-shaped seats 65a, 67a, 65b, 67b of the respective first and second clamping assemblies 60a, 60b and the frame portions. Or, as an alternative, rubber channel pieces (not shown) could be applied on each of the edges of the V-shaped seats 65a, 67a, 65b, 67b of the respective first and second clamping assemblies 60a, 60b. Referring once again to FIGS. 2 and 3, each clamping plate 72a, 72b defines an upper slit 75a, 75b configured to receive the upper panel 64a, 64b of the U-shaped member 62a, 62b of the respective clamping assemblies 60a, 60b. Each clamping plate 72a, 72b further defines a lower slit 77a, 77b configured to receive the lower panel 66a, 66b of the U-shaped member 62a, 62b of the respective clamping assemblies 60a, 60b. The free ends of the U-shaped members 62a, 62b thus pass through the clamping plates 72a, 72b, such that the clamping plates 72a, 72b are substantially parallel to the base panel 68a, 68b of the respective U-shaped members 62a, 62b, as perhaps best shown in FIG. 3. As described above, the U-shaped member 62a and a clamping plate 72a are held together by two bolts 73a, 74a and associated nuts, while the U-shaped member 62b and a clamping plate 72b are similarly held together by two bolts 73b, 74b and associated nuts. Such bolts 73a, 74a, 73b, 74b provide a means of adjusting the distance between the clamping plates 72a, 72b and the base panels 68a, 68b of the respective U-shaped members 62a, 62b. Specifically, tightening the bolts 73a, 74a reduces the distance between the clamping plate 72a and the base panel 68a of the U-shaped member 62a, such that the first clamping assembly 60a is pressed into secure frictional engagement with the parallel plates 32, 34 of the first arm 30. Of course, loosening the bolts 73a, 74a allows for an increase in the distance between the clamping plate 72a and the base panel 68a of the U-shaped member 62a, which allows for a loose engagement of the first clamping assembly 60a with respect to the first arm 30, the importance of which is further discussed below. Similarly, tightening the bolts 73b, 74b reduces the distance between the clamping plate 72b and the base panel 68b of the U-shaped member 62b of the second clamping assembly 60b, while loosening the bolts 73b, 74b allows for an increase in the distance between the clamping plate 72b and the base panel 68b of the U-shaped member 62b of the second clamping assembly 60b.

Referring still to FIGS. 2 and 3, the first clamping assembly 60a is configured to surround the first arm 30 of the accessory mount 10, while the second clamping assembly 60b is configured to surround the second arm 40 of the accessory mount 10. For example, with respect to the first arm 30 and the first clamping assembly 60a, the upper panel 64a of the U-shaped member 62a is adjacent to the upper plate 32 of the first arm 30, the lower panel 66a of the U-shaped member 62a is adjacent to the lower plate 34 of the first arm 30, and the base panel 68a of the U-shaped member 62a and the clamping plate 72a are contacting and engaging the edges of the two parallel plates 32, 34 of the first arm 30. In this way, the clamping assembly 60a is capable of sliding along the length of the first arm 30, as illustrated by arrow D in FIG. 3, but its position can be fixed as desired. The second clamping assembly 60b is similarly capable of sliding along the length of the second arm 30, as illustrated by arrow E in FIG. 3, but its position can also be fixed as desired.

Furthermore, in this exemplary embodiment, the first clamping assembly 60a includes an internal sleeve 70a, which maintains a minimum spacing between the clamping plate 72a and the base panel 68a of the U-shaped member 62a of the first clamping assembly 60a. Similarly, in this exemplary embodiment, the second clamping assembly 60b includes an internal sleeve 70b, which maintains a minimum spacing between the clamping plate 72b and the base panel 68b of the U-shaped member 62b of the first clamping assembly 60b.

Referring now to FIGS. 1 and 3, in installing the accessory mount 10 on a mower 100, the length of the lateral bar 20 is adjusted, as illustrated by arrow A in FIG. 3, to provide a gross adjustment, such that the accessory mount 10 can be secured (at least loosely) to and between the frame portions 102, 104, which again are for mounting the casters 103, 105. Specifically, with the fastener 21 removed, the second member 26 of the lateral bar 20 is slid relative to the first member 22 of the lateral bar 20. This adjustment in the length of the lateral bar 20 also adjusts the distance between the first clamping assembly 60a and the second clamping assembly 60b, so that the clamping assemblies 60a, 60b are positioned on either side of the frame portions 102, 104 of the mower 100, with the V-shaped seats 65a, 65b, 67a, 67b of the respective clamping assemblies 60a, 60b in contact with the frame portions 102, 104. The fastener 21 is then inserted through the first and second members 22, 26, fixing the position of the first member 22 relative to the second member 26.

The angle, α, of the second arm 40 relative to the lateral bar 20 is then adjusted, as illustrated by arrows B and C in FIG. 3, to ensure a firm engagement between the accessory mount 10 and the mower 100. Specifically, the angle, α, between the angled portions 42a, 44a of the second arm 40 and the lateral bar 20 is adjusted by way of the adjustment rod 54 to bring the clamping assemblies 60a, 60b firmly against the frame portions 102, 104 of the mower 100. As described above, the adjustment rod 54 is rotated to extend the end cap 58 of the adjustment rod 54 away from the connecting plate 52 and toward the lateral bar 20. Once the end cap 58 of the adjustment rod 54 contacts the lateral bar 20 (as shown in FIG. 3), further rotation of the adjustment rod 54 causes the connecting plate 52 to move away from the lateral bar 20, thus causing the second arm 40 to pivot about the longitudinal axis defined by the bolt 48. Such rotation of the second arm (counterclockwise in FIG. 3, in the direction of arrow B) shortens the distance between the distal ends 36, 46 of the first and second arms 30, 40, thus ensuring a firm engagement of the clamping assemblies 60a, 60b with the frame portions 102, 104 of the mower 100.

Finally, the clamping assemblies 60a, 60b are capable of adjusting the distance of the lateral bar 20 from the mower 100. Specifically, as described above, the bolts (or similar fasteners) 73a, 74a, 73b, 74b connecting the U-shaped members 62a, 62b and the clamping plates 72a, 72b of each clamping assembly 60a, 60b can be loosened to allow the clamping assemblies 60a, 60b to slide along the length of the first and second arms 30, 40. Thus, the lateral bar 20 can be adjusted closer to the mower 100 by sliding the clamping assemblies 60a, 60b toward the lateral bar 20, and the lateral bar 20 can be adjusted away from the mower 100 by sliding the clamping assemblies 60a, 60b away from the lateral bar 20, as illustrated by arrows D and E in FIG. 3.

Once the lateral bar 20 is the desired distance from the mower 100, the bolts 73a, 73b, 74a, 74b of the clamping assemblies 60a, 60b are tightened, reducing the distance between the base panels 68a, 68b of the U-shaped members 62a, 62b and the clamping plates 72a, 72b of the respective first and second clamping assemblies 60a, 60b, such that the first and second clamping assemblies 60a, 60b are pressed into secure frictional engagement with the first and second arms 30, 40. Of course, adjustments to the position of the clamping assemblies 60a, 60b could be performed before or after securing the accessory mount 10 to the mower 100.

Advantageously, the frictional engagement between the clamping assemblies 60a, 60b and the first and second arms 30, 40, as opposed to other forms of attachment, also provides a safe "failure point" if the mower 100 strikes an object. Specifically, if an accessory, such as a dethatcher 200, that is secured with the accessory mount 10 to the mower 100 strikes an object, the clamping assemblies 60a, 60b can slide along the first and second arms 30, 40 to absorb the impact. In this way, other portions of the accessory mount 10, the dethatcher 200, and the mower 100 are protected from potential damage. The clamping assemblies 60a, 60b can then be returned to the original position to continue operation of the mower 100.

Referring now to FIGS. 1-4, in some exemplary embodiments, the accessory mount 10 further comprises two brackets 80a, 80b slideably attached to the lateral bar 20. The brackets 80a, 80b are configured for attaching turf and grounds care accessories to the accessory mount 10.

Figure 4:
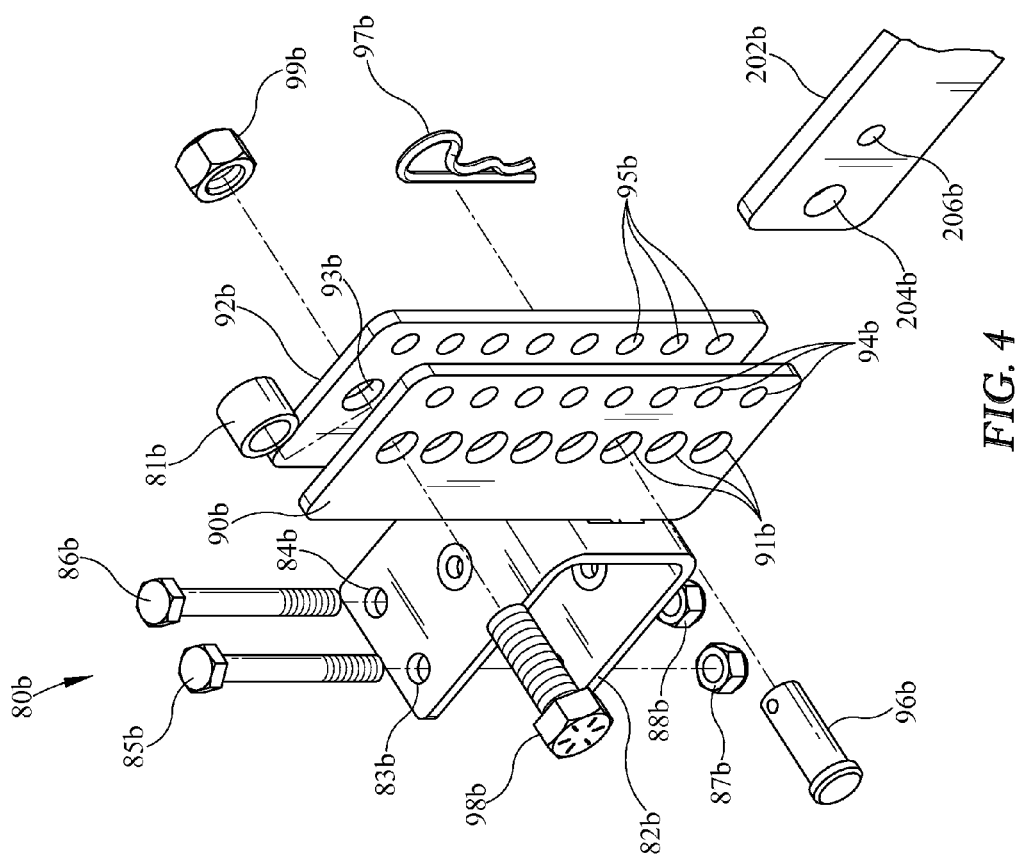
FIG. 4 is an enlarged, exploded perspective view of the connection between a bracket of the exemplary accessory mount of FIG. 1 and the dethatcher of FIG. 1.

For instance, as perhaps best shown in FIG. 4, each exemplary bracket 80b (one of which is shown in FIG. 4) is comprised of a U-shaped member 82b and two parallel plates 90b, 92b that are attached to and extend from the U-shaped member 82b in a substantially vertical orientation. Two holes are defined at each the distal (free) ends of the U-shaped member 82b (although only the upper holes 83b, 84b are visible in FIG. 4), such that the bracket 80b can be attached to the lateral bar 20 of the accessory mount 10 by inserting bolts 85b, 86b (or similar fasteners) through the holes (including the upper holes 83b, 84b) defined by the distal (free) ends of the U-shaped member 82b, and then securing these bolts 85b, 86b with respective nuts 87b, 88b. Tightening the bolts 85b, 86b brings the two side walls of the U-shaped member 82b in firm engagement with the lateral bar 20 of the accessory mount 10.

The other bracket 80a is substantially identical to the bracket 80b shown in FIG. 4, except that, as the second member 26 of the lateral bar 20 is configured to fit over the first member 22 of the lateral bar 20, it is further contemplated that the other bracket 80a includes a U-shaped member that is smaller than the U-shaped member 82b of the bracket 80b shown in FIG. 4. In this way, each bracket 80a, 80b fits snugly over the respective first or second members 22, 26 of the lateral bar 20.

Referring again to FIG. 4, the two parallel plates 90b, 92b extend upward from the U-shaped member 82b of the bracket 80b, and each of the parallel plates 90b, 92b defines a first column of larger holes 91b, 93b (i.e., one or more holes) evenly spaced along the length of the plate 90b, 92b (i.e., aligned vertically) and a second column of smaller holes 94b, 95b parallel to the first column of holes 91b, 93b. Each of the two parallel plates 90b, 92b in the bracket 80b is attached to the U-shaped member 82b, such that every hole defined by one plate 90b is substantially aligned with a respective hole defined by the other plate 92b, as further discussed below. The other bracket 80a similarly includes two parallel plates with first columns of larger holes and second columns of smaller holes.

Referring now to FIG. 2, in operation, the brackets 80a, 80b are attached to the lateral bar 20 by first sliding the brackets 80a, 80b onto the lateral bar 20 with the distal ends of the U-shaped members positioned on the top and bottom of the lateral bar 20, such that the parallel plates extend away from the front of the mower 100. Bolts (such as bolts 85b, 86b in FIG. 4) are then inserted through the holes (such as holes 83b, 84b in FIG. 4) in the distal ends of the U-shaped members and then tightened to secure the brackets 80a, 80b to the lateral bar 20. Of course, the position of the brackets 80a, 80b can be adjusted by loosening the bolts and sliding the brackets 80a, 80b along the length of the lateral bar 20.

Referring now to FIGS. 1 and 4, in one exemplary embodiment, a dethatcher 200 is mounted to the mower 100 using the accessory mount 10 of the present invention. The dethatcher 200 includes two attachment portions 202a, 202b, with the end of each attachment portion 202a, 202b placed between the two parallel plates of one of the two brackets 80a, 80b. As perhaps best shown in FIG. 4, one of the two attachment portions 202b of the dethatcher 200 is then attached to the bracket 80b of the accessory mount 10 by a pin 96b. In this regard, the attachment portion 202b defines a mounting hole 204b, which is placed in registry with one of the holes in the first column of larger holes 91b defined by the first parallel plate 90b and with one of the holes in the first column of larger holes 93b defined by the second parallel plate 92b. The pin 96b is then inserted through the parallel plates 90b, 92b and the mounting hole 204b and is then secured in this position by a cotter pin 97b. The other attachment portion 202a of the dethatcher 200 is similarly attached to the other bracket 80a of the accessory mount 10.

As a further refinement, and as also shown in FIG. 4, a spacer 81b is positioned between the two parallel plates 90b, 92b and held in place by a bolt 98b and nut 99b combination. It is contemplated that the spacer 81b helps to maintain the spacing of the parallel plates 90b, 92b such that the attachment portion 202b is able to rotate about the pin 96b.

Figure 5:
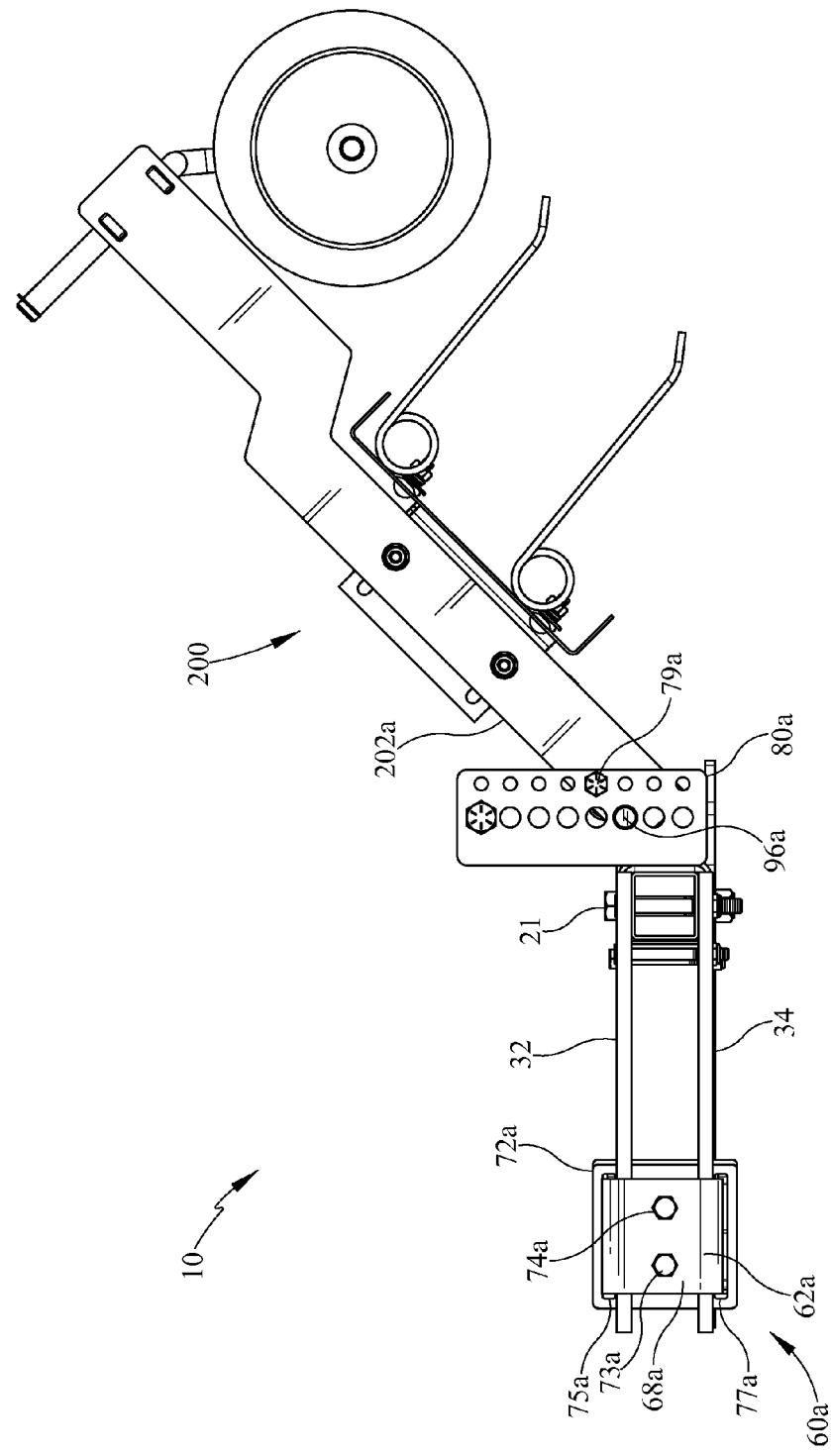
FIG. 5 is a partial side view of the exemplary accessory mount of FIG. 1 and the dethatcher of FIG. 1, which illustrates the dethatcher accessory in a disengaged position.

Referring now to FIGS. 1, 4, and 5, the dethatcher 200 (or other accessory) is thus rotatable between an engaged position (FIG. 1) and a disengaged position (FIG. 5). To achieve this, the attachment portion 202b of the dethatcher 200 further defines a second smaller positioning hole 206b (FIG. 4). Upon rotating the dethatcher 200 about a longitudinal axis of the pins 96a, 96b (FIG. 1) which attaches the dethatcher 200 to the accessory mount 10, as discussed above, the positioning hole 206b (FIG. 4) defined by the attachment portion 202b can be placed in registry with one of the second column of smaller holes 94b, 95b in the parallel plates 90b, 92b of the bracket 80b. A smaller second pin is then inserted through the parallel plates 90b, 92b and the positioning hole 206b to maintain the dethatcher in the disengaged position. Of course, an identical pin would preferably be inserted through the other bracket 80a, and such a pin 79a is shown in FIG. 5. Advantageously, maintaining the dethatcher 200 (or other accessory) in a disengaged position allows an operator to drive the mower 100 to a particular location with the dethatcher 200 attached to the mower 100, while not actually dethatching the ground on the way to the particular location.

Of course, the accessory mount of the present invention can be used with turf or grounds care equipment other than zero-turn radius mowers (including, for example, various other mowers or ride-on spreader/sprayers) or with turf and grounds care accessories other than a dethatcher. To this end, the exact configuration of the brackets and their position on the lateral bar may vary depending on the particular accessory being attached. For example, it is contemplated that the brackets can be removed from the lateral bar and reinstalled with the parallel plates of the brackets extending downward from the U-shaped member. In other words, the brackets would be attached upside down as compared to the brackets 80a, 80b shown in FIGS. 1-5.

One of ordinary skill in the art will also recognize that additional embodiments are also possible without departing from the teachings of the present invention. This detailed description, and particularly the specific details of the exemplary embodiments disclosed therein, is given primarily for clarity of understanding, and no unnecessary limitations are to be understood therefrom, for modifications will become obvious to those skilled in the art upon reading this disclosure and may be made without departing from the spirit or scope of the present invention.

What is claimed is:

1. A combination, comprising:
   an article of turf or grounds care equipment having a first frame portion for mounting a first front caster and a second frame portion for mounting a second front caster; and
   an accessory mount, including
      a lateral bar having a first end and a second end opposite the first end,
      one or more brackets attached to and extending from the lateral bar between the first end and the second end, said one or more brackets being configured to mount an accessory,
      a first arm connected to the first end of the lateral bar and terminating in a distal end,
      a second arm pivotally connected to the second end of the lateral bar and terminating in a distal end, wherein the second arm further comprises an angled portion opposite the distal end of the second arm, and wherein an angle is defined between the angled portion of the second arm and the lateral bar, and
      an adjustment rod operably connected to the angled portion of the second arm, with a distal end of the adjustment rod contacting the lateral bar, such that rotation of the adjustment rod causes the second arm to pivot relative to the lateral bar, thus increasing the angle between the angled portion of the second arm and the lateral bar, and thus shortening a distance between the distal end of the first arm and the distal end of the second arm,
      wherein the first arm and the second arm of the accessory mount are configured to engage the first frame portion and the second frame portion of the article of turf or grounds care equipment.

2. The combination of claim 1, wherein the lateral bar comprises a first member including the first end of the lateral bar and a second member including the second end of the lateral bar, and wherein the second member is adjustably connected to the first member, such that movement of the second member relative to the first member adjusts the distance between the distal end of the first arm and the distal end of the second arm.

3. The combination of claim 2, wherein the second member is configured to fit over and slide relative to the first member.

4. The combination of claim 3, wherein one of first member and the second member of the lateral bar defines a series of holes at predetermined intervals, wherein the other of the first member and the second member of the lateral bar defines at least one hole, and wherein, upon placing selected holes defined by the first member and the second member in registry with one another, a fastener is insertable through the selected holes for fixing the position of the first member relative to the second member.

5. The combination of claim 1, and further comprising:
a first clamping assembly adjustably connected to the first arm; said first clamping assembly including a V-shaped seat configured to engage a respective frame portion of the article of turf or grounds care equipment; and
a second clamping assembly adjustably connected to the second arm, said second clamping assembly also including a V-shaped seat configured to engage a respective frame portion of the article of turf or grounds care equipment.

6. The combination of claim 5, wherein the first clamping assembly is in frictional engagement with the first arm, and the second clamping assembly is in frictional engagement with the second arm.

7. The combination of claim 1, wherein each of the one or more brackets comprises a pair of parallel plates, each parallel plate defining one or more holes, wherein, each of the one or more holes defined in one of the pair of parallel plates is aligned with a respective hole defined by a second of the pair of parallel plates, such that a pin is insertable through the aligned holes and is configured to engage a mounting hole of the accessory.

8. The combination of claim 1, wherein each of the one or more brackets is selectively moveable along the length of the lateral bar, such that its position relative to the first end and the second end of the lateral bar can be adjusted.

9. The combination of claim 1, wherein at least two brackets are attached to the lateral bar between the first end and the second end and are configured to mount the accessory.

10. An accessory mount for an article of turf or grounds care equipment, comprising:
a lateral bar having a first end and a second end opposite the first end;
a first arm connected to the first end of the lateral bar and terminating in a distal end;
a second arm pivotally connected to the second end of the lateral bar and terminating in a distal end;
a first clamping assembly adjustably connected to the first arm, said first clamping assembly including a V-shaped seat configured to engage a respective frame portion of the article of turf or grounds care equipment; and
a second clamping assembly adjustably connected to the second arm, said second clamping assembly also including a V-shaped seat configured to engage a respective frame portion of the article of turf or grounds care equipment;
wherein pivoting the second arm relative to the lateral bar adjusts a distance between the distal end of the first arm and the distal end of the second arm;
wherein the first and second arms of the accessory mount are configured to engage respective frame portions of the article of turf or grounds care equipment; and
wherein each of the first clamping assembly and the second clamping assembly further includes
a U-shaped member having an upper panel and a lower panel connected by a base panel,
a clamping plate defining an upper slit configured to receive the upper panel of the U-shaped member and a lower slit configured to receive the lower panel of the U-shaped member, such that the clamping plate is substantially parallel to the base panel of the U-shaped member with the respective first or second arm substantially surrounded by the upper panel of the U-shaped member, the lower panel of the U-shaped member, the base panel of the U-shaped member, and the clamping plate, and
one or more fasteners for adjusting the distance between the clamping plate and the base panel of the U-shaped member, wherein, upon tightening the one or more fasteners, the clamping plate and the base panel of the U-shaped member frictionally engage the respective first or second arm.

11. A combination, comprising:
an article of turf or grounds care equipment; and
an accessory mount, including
a lateral bar, including
a first member including a first end of the lateral bar, and
a second member adjustably connected to the first member, the second member including a second end of the lateral bar opposite the first end;
a first arm connected to the first end of the lateral bar;
a second arm pivotally connected to the second end of the lateral bar and terminating in a distal end, wherein the second arm further comprises an angled portion opposite the distal end of the second arm, and wherein an angle is defined between the angled portion of the second arm and the lateral bar;
an adjustment rod operably connected to the angled portion of the second arm, with a distal end of the adjustment rod contacting the lateral bar;
a first clamping assembly connected to the first arm; and
a second clamping assembly connected to the second arm;
one or more brackets attached to and extending from the lateral bar between the first end and the second end, said one or more brackets being configured to mount an accessory to the article of turf or grounds care equipment;
wherein adjusting the second member of the lateral bar relative to the first member of the lateral bar adjusts a distance between the first clamping assembly and the second clamping assembly;
wherein rotation of the adjustment rod causes the second arm to pivot relative to the lateral bar, thus increasing the angle between the angled portion of the second arm and the lateral bar, and thus shortening the distance between the first clamping assembly and the second clamping assembly; and
wherein the first clamping assembly and the second clamping assembly are each configured to engage a frame portion of the article of turf or grounds care equipment.

12. A combination, comprising:
an article of turf or grounds care equipment having a first frame portion for mounting a first front caster and a second frame portion for mounting a second front caster; and
an accessory mount, including
- a lateral bar having a first end and a second end opposite the first end,
- a first arm connected to the first end of the lateral bar,
- a second arm pivotally connected to the second end of the lateral bar,
- a first clamping assembly connected to the first arm and configured to engage the first frame portion of the article of turf or grounds care equipment adjacent to the first front caster, and
- a second clamping assembly connected to the second arm and configured to engage the second frame portion of the article of turf or grounds care equipment adjacent to the second front caster,
- wherein pivoting the second arm relative to the lateral bar adjusts a distance between the first clamping assembly and the second clamping assembly;

an accessory, including an attachment portion, the attachment portion of the accessory defining a mounting hole;
wherein the accessory mount further includes first and second parallel plates connected to the lateral bar, each of the first and second parallel plates defining a first column of holes, such that each of the holes of the first column of holes defined in the first parallel plate is aligned with a corresponding hole in the first column of holes defined in the second parallel plate;
wherein the attachment portion of the accessory is placed between both of the first and second parallel plates, with the mounting hole defined in the attachment portion placed in registry with a selected hole of the first column of holes defined in the first parallel plate and the corresponding hole of the first column of holes defined in the second parallel plate; with a first pin being inserted through the selected hole of the first column of holes defined in the first parallel plate, the mounting hole defined in the attachment portion, and the corresponding hole of the first column of holes defined in the second parallel plate;
wherein the accessory is rotatable about a longitudinal axis of the first pin between an engaged position and a disengaged position;
wherein each of the first and second parallel plates defines a second column of holes, such that each of the holes of the second column of holes defined in the first parallel plate is aligned with a corresponding hole in the second column of holes defined in the second parallel plate;
wherein the attachment portion of the accessory further defines a positioning hole; and
wherein the positioning hole defined in the attachment portion is placed in registry with a selected hole of the second column of holes defined in the first parallel plate and the corresponding hole of the second column of holes defined in the second parallel plate, with a second pin being inserted through the selected hole of the second column of holes defined in the first parallel plate, the positioning hole defined in the attachment portion, and the corresponding hole of the second column of holes defined in the second parallel plate to maintain the accessory in the disengaged position.

13. The combination of claim 12, wherein the article of turf or grounds care equipment is a mower.

14. The combination of claim 13, wherein the mower is a zero-turn radius mower.

* * * * *